United States Patent [19]
Kay et al.

[11] Patent Number: 5,703,881
[45] Date of Patent: *Dec. 30, 1997

[54] MULTI-SUBSCRIBER UNIT FOR RADIO COMMUNICATION SYSTEM AND METHOD

[75] Inventors: Stanley E. Kay, Rockville; Pradeep Kaul, Darnestown, both of Md.; Michael L Parr; Graham Avis, both of San Diego, Calif.; John E. Corrigan, III, Chevy Chase, Md.; Daniel Wendling, Darnestown, Md.; Ashok D. Mehta, North Potomac, Md.

[73] Assignee: Hughes Electronics, Los Angeles, Calif.

[*] Notice: The term of this patent shall not extend beyond the expiration date of Pat. No. 5,299,198.

[21] Appl. No.: 28,502

[22] Filed: Mar. 9, 1993

Related U.S. Application Data

[63] Continuation-in-part of Ser. No. 929,337, Aug. 13, 1992, abandoned, which is a continuation-in-part of Ser. No. 622,232, Dec. 6, 1990, Pat. No. 5,299,198.

[51] Int. Cl.[6] ............................................. H04J 3/17
[52] U.S. Cl. ...................... 370/468; 455/34.1; 455/33.1; 379/59; 370/310
[58] Field of Search ................ 370/80, 95.3, 94.1, 370/95.1, 109, 60, 468, 458, 433, 389, 311, 521, 352, 310; 455/33.1, 33.2, 33.3, 33.4, 93, 34.1; 379/59, 60, 61, 62, 63, 58; 375/260, 296

[56] References Cited

U.S. PATENT DOCUMENTS

| | | | |
|---|---|---|---|
| 4,625,308 | 11/1986 | Kim et al. | 370/104 |
| 4,675,863 | 6/1987 | Paneth et al. | 370/109 |
| 4,737,975 | 4/1988 | Shafer | 379/58 |
| 4,782,485 | 11/1988 | Gollub | 370/118 |
| 4,839,892 | 6/1989 | Sasaki | 370/95.1 |
| 4,916,691 | 4/1990 | Goodman | 370/60 |
| 4,920,484 | 4/1990 | Ranade | 370/60 |
| 5,060,294 | 10/1991 | Schwent et al. | 455/93 |
| 5,299,198 | 3/1994 | Kay et al. | 370/95.3 |
| 5,329,576 | 7/1994 | Handforth | 379/58 |
| 5,343,513 | 8/1994 | Kay et al. | 370/95.3 |
| 5,351,016 | 9/1994 | Dent | 375/296 |
| 5,381,459 | 1/1995 | Lappington | 375/260 |

Primary Examiner—Douglas W. Olms
Assistant Examiner—Shick Hom
Attorney, Agent, or Firm—John T. Whelan; Wanda Denson-Low

[57] ABSTRACT

A multisubscriber unit is disclosed for use of in a digital cellular communication system to communicate with a base transceiver station and eventually to switched telephone network. The multisubscriber unit connects to a plurality of individual subscriber telephones. It includes a plurality of upconverters, modulators, downconverters, demodulators speech compressors, speech decompressors, and voice activity detectors that are assigned to a subscriber telephone upon detection of an off hook signal from the telephone. Preferably, upon the detection of data to be transmitted, to channel allocation is requested from a pool of time division multiple access channels in a digital speech interpolation pool.

47 Claims, 12 Drawing Sheets

MULTI-SUBSCRIBER UNIT FOR RADIO COMMUNICATION SYSTEM AND METHOD

This application is a continuation-in-part application of U.S. patent application 07/929,337 filed Aug. 13, 1992, abandoned, and is a continuation-in-part of U.S. patent application Ser. No. 07/622,232 filed on Dec. 6, 1990, now U.S. Pat. No. 5,299,198 which applications are relied upon and incorporated by reference herein. The U.S. patent application 07/929,337 also being a continuation in part of U.S. Pat. No. 5,299,198.

BACKGROUND OF THE INVENTION

1. Field of Invention

The present invention relates to a radio communications; and more particularly to a system and method having a number of fixed telephone units in close proximity to one another. While the invention is subject to a wide range of applications, it is especially suited for use in a cellular communication system and method; and will be particularly described in that connection.

2. Discussion of Related Art

Fixed telephone service may be provided by several different types of systems. The most common is wiring telephone lines directly to the home. However, in more primitive, or sparsely settled countries, such systems, are either not economically feasible, or the time required for installation is substantially protracted. Wireless telephone systems for fixed installations have been proposed that overcome some of the disadvantages of wired systems. One such system involves using a 450 MHz frequency to provide a connection between a local office and a subscriber's home. Such a system is designed for low density rural application, and does not achieve the spectral efficiency and frequency reuse needed to service high density city environments.

Other systems have been proposed that utilize a large number of transmission sites (microcells) which must be deployed to geographically cover a specifically inhabitated area. This multiplicity of sites must receive electrical power, and also be tied back to one or more switching centers. However, the cost of power, backhaul facilities and the microcells themselves are not always cost effective for certain applications.

Cellular communication systems are now used for mobile telephone service where radio coverage is divided into cells; and each cell is assigned a number of available radio frequencies. A mobile telephone station transmits and receives control and voice communication information from a base station within the same cell. The base stations of each cell are controlled by a cellular system switching and control network that provides connection with the world wide telecommunication system.

There are many different formats for cellular communication systems. In one type of digital cellular communication system, for example, the allocated transmit and receive frequency bands are divided into individual radio channels of communication, with the transmit and receive frequencies being separated from each other. Each radio channel has a frame format, that is, each channel transmits a succession of frames, which has a duration typically of forty milliseconds, and constitutes one cycle of a regularly recurring series. Each subscriber's information is transmitted in one of six time slots. Each time slot includes one hundred sixty-two symbols, and has a duration of approximately 6.67 milliseconds. Each slot corresponds to a burst of RF energy that includes compressed digital speech signals, which are decompressed at the receiving station and converted to analog or sixty-four Kilobits Per second (KBPS) pulse code modulation (PCM) speech.

Typically, an encoder is provided for each transmitter, both at a base station and a mobile station, which compresses the speech signals before modulation and transmission thereof. One type of digital cellular communication system, for example, includes a technique for low rate speech coding, referred to as Codebook Excited Linear Prediction (CELP), which involves searching a table or codebook of randomly distributed excitation codewords for that codeword which, when filtered through pitch and linear predictive coding short term synthesis filters, produces an output sequence which is closest to the input sequence. This output sequence of synthesized speech codes occurs upon excitation of the input sequence which, in turn, occurs upon the introduction of the digital equivalent of analog speech.

Provided the antennas of each of the wireless telephones are not shielded, it is technically possible for fixed subscribers to use the mobile telephones. Due to the much greater subscriber densities in fixed systems, such use could soon result in too many subscribers for a single cell, thus, over taxing the capacity of a single cell site. Also, the expense of a complete mobile telephone for each subscriber could be a financial burden.

In light of the foregoing, there is a need for a communication system for fixed subscribers which provides quality as high as a mobile cellular communication system, but which is suitable for high density applications in a cost effective manner.

SUMMARY OF INVENTION

Accordingly, the present invention is directed to a multi-subscriber unit for a fixed cellular communication system and method that substantially obviates one or more of the limitations and disadvantages of the related art.

Additional advantages of the invention will be set forth in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, the invention comprises a multi-subscriber unit having means for connecting a plurality of individual telephones and an antenna for radiating and collecting signals to and from a remotely located base station of a radio communication system. The multi-subscriber unit comprises a voice subscriber interface for detecting an off-hook condition of each of the plurality of telephone handsets; a voice activity detector means for detecting voice activity of each individual telephone; processing means for coding speech to reduce transmission bit rate requirement and to synthesize speech; transmission and RF distribution means for transmitting the speech signals of each of the plurality of handsets having voice activity to the remotely located base station; and a controller for managing the processing means, speech compression, and transmission functions for the plurality of individual telephones.

In another aspect, the present invention is a method of communicating between a plurality of individual telephones and a base station via a multi-subscriber unit commonly connected to the plurality of telephones, the method comprising generating at the multi-subscriber unit a signal indicating an off hook condition of corresponding ones of the telephones; selecting one of a plurality of speech encoders in response to the generated off hook signal and sending a dial tone to the corresponding individual subscriber telephone; transmitting a signal requesting a reverse allocation of the transceiver of the base station; transmitting a reverse assignment to the multi-subscriber unit from the base station to assign a frequency and reverse a time slot in a digital signal interpolation pool; transmitting to the base station from the multi-subscriber unit a call origination message in a sequence of at least one time slot of a frame of information; transmitting a request to deallocate the frequency and time slot in response to the call origination message; and repeating the steps of transmitting the allocation request signal, the assignment signal, and the message in response to each speech spurt.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the invention and together with the description, serve to explain the principles of the invention.

DETAILED DESCRIPTION OF THE PREFERRED EMBODIMENTS

Figure 1:
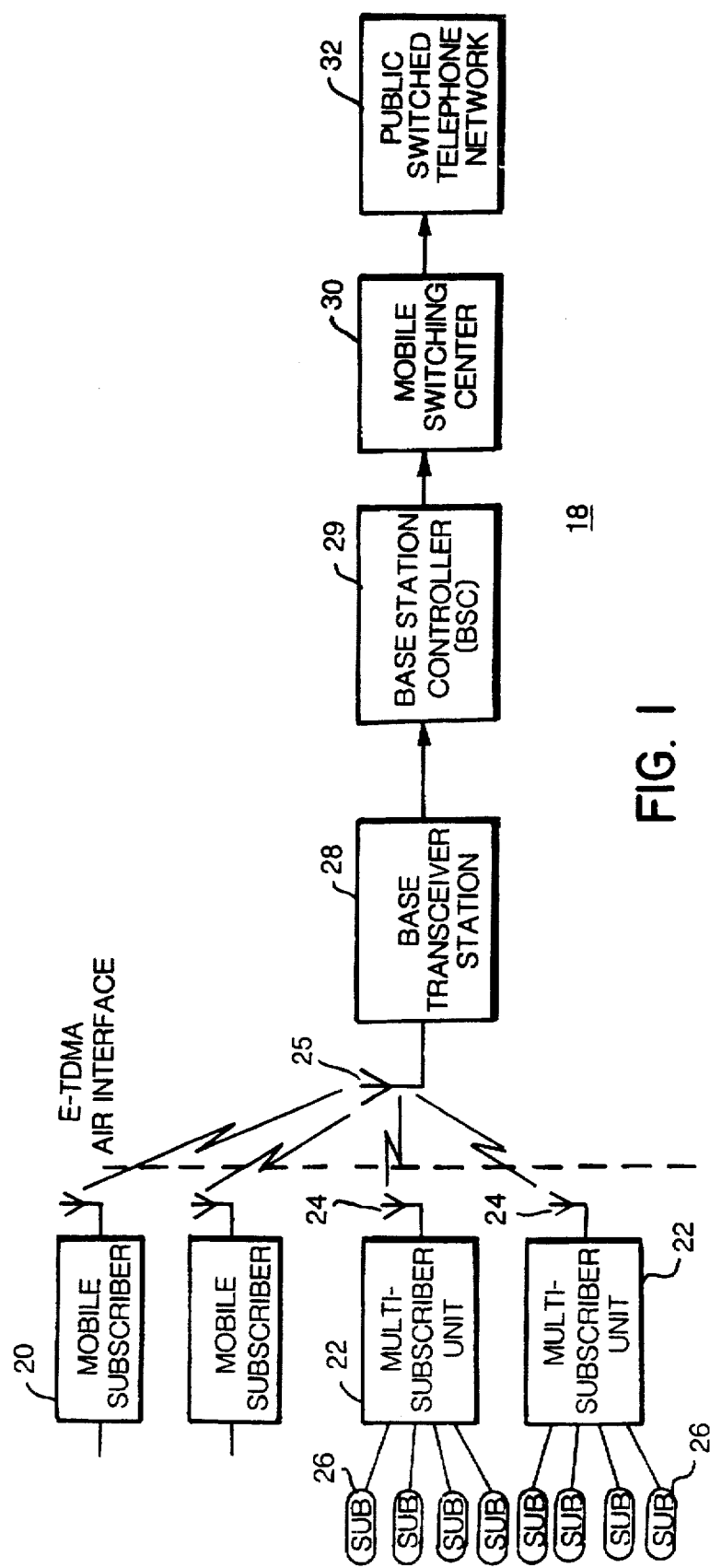
FIG. 1 is a schematic block diagram of a fixed cellular system having a multi-subscriber unit in accordance with the present invention.

Reference will now be made in detail to the present preferred embodiment of the invention, an example of which is illustrated in the accompanying drawings. Wherever possible, the same reference numerals will be used throughout the drawings to refer to the same or like components. When using the term connected or electrically connected herein, it is not intended to mean directly connected but may mean ultimately connected, where components may be connected therebetween but are omitted in that they do not aid in the understanding of the invention. Also, when using the term switch herein, it is understood that it can be any device or method for connecting and unconnecting inputs and outputs of software or hardware components.

Prior to discussing the details of the illustrated system, the system can be best understood by first presenting a general overview and discussion of the system, its architecture and requirements.

A fixed wireless network is capable of bringing telephone service to developing countries in a timely and cost effective manner. Due to the lack of established infrastructure, such as land or wire lines, which are needed to provide regular telephony service, the cellular system of the present invention will be used as the system base. The described system uses RF or over-the-air channels to connect individual subscribers or groups of fixed subscribers to the public telephone network. The use of a cellular system as the basis for the fixed wireless network removes the need to provide wire or other land lines between subscriber sites and the telephone network.

The cellular system includes a mobile communication system, wherein the geographic area to be served by the system is divided into a number of sections called cells. Each cell is served by a base station which consists of radio transceiver equipment that is capable of covering its cell region. The base station communicates with mobile terminals and fixed terminals over a specified set of air carrier channels. Mobile terminals may consist of vehicle mounted, hand-held and other portable telephone sets, and the fixed terminals may be located in an apartment house or relatively small neighborhood. The set of base stations in one installation is served by mobile switching centers which provide a seamless interface to and from the conventional Public Switched Telephone network (PSTN).

For stationary subscribers the system pools a group of co-located subscribers and serves them by a shared, multi-user terminal referred to as a multi-subscriber unit, or MSU. The resources of the MSU are allocated to a subscriber on a call-by-call basis. This shared resource approach greatly reduces the amount of required hardware, thus keeping the cost-per-subscriber low. By appropriate dimensioning of MSU resources, the reliability and availability of telecommunications services can be ensured. The components are similar to the system described in the aforementioned referenced U.S. patent application with the addition of the MSU to provide telecom services to a cluster of subscribers.

The wireless system has a base station subsystem which can be either a self-contained unit or further subdivided into a base station controller (BSC) with one or more subordinate Base Transceiver Stations (BTS). The BSC is responsible for performing call and channel management. The fixed subscribers will preferably use a modified speech compression algorithm similar to the mobile, which is less processing-intensive than the mobile subscribers speech compression algorithm. The mobile subscribers may use the full rate digital time division multiple access as described in EIA/TIA IS-54. The base station controller shall process calls for both fixed and mobile subscribers. Individual subscriber telephones preferably may handle either fixed or mobile speech algorithms. In other words one group of speech algorithms shall serve fixed users and another group shall serve mobile users. Mobile subscribers may use an analog, time division multiple access system, and preferably an time division multiple access system of the type described in U.S. Pat. No. 5,299,198, filed on Dec. 6, 1990.

Base transceiver stations provide a number of radio channels. Each radio channel preferably is configured to support either fixed subscribers or mobile subscribers. The radio channels used for fixed subscribers are processed on a single channel unit. Several fixed subscribers shall be supported by a single multi-subscriber unit hereinafter described.

Reference will now be made in detail to the present preferred embodiments of the invention, examples of which are illustrated in the accompanied drawings.

The exemplary embodiment of the system of the present invention is shown in FIG. 1 and is represented generally by the reference numeral 18. Referring to FIG. 1, a wireless telephone system 18 comprises a plurality of mobile subscribers 20, and one or more multi-subscriber (MSU) units 22 for each cell. Each MSU 22 has two sides. One side has an antenna 24 facing antenna 25 of a remotely located base transceiver station 28, and another side to which is connected a plurality of individual fixed telephones 26. The individual fixed telephones, typically less than one hundred are aggregated at MSU 22. MSU 22 preferably has fewer outgoing voice circuits than incoming voice interfaces so that some degree of aggregation is performed locally. Telephones 26 may be wire or radio coupled to the respective unit 22, and may be any type of voice or visual interface between the person and system such as a handset, speaker phone, or videophone, for example.

The fixed wireless system 18 includes a base transceiver station 28, a base station controller (BSC) 29, which is connected to a mobile switching center (MSC), 30 which is connected to a public switched telephone network 32, which network is not part of the present system. The BSC and MSC may be combined in an alternative embodiment.

There are two alternative embodiments of the MSU. The locally non-blocking configuration shown in FIG. 2, can simultaneously establish calls to all of the attached subscriber handsets 26 without providing dedicated radio and voice coding components to each active call. The alternative configuration shown in FIG. 3 dedicates voice coding and radio components to each active call.

Figure 2:
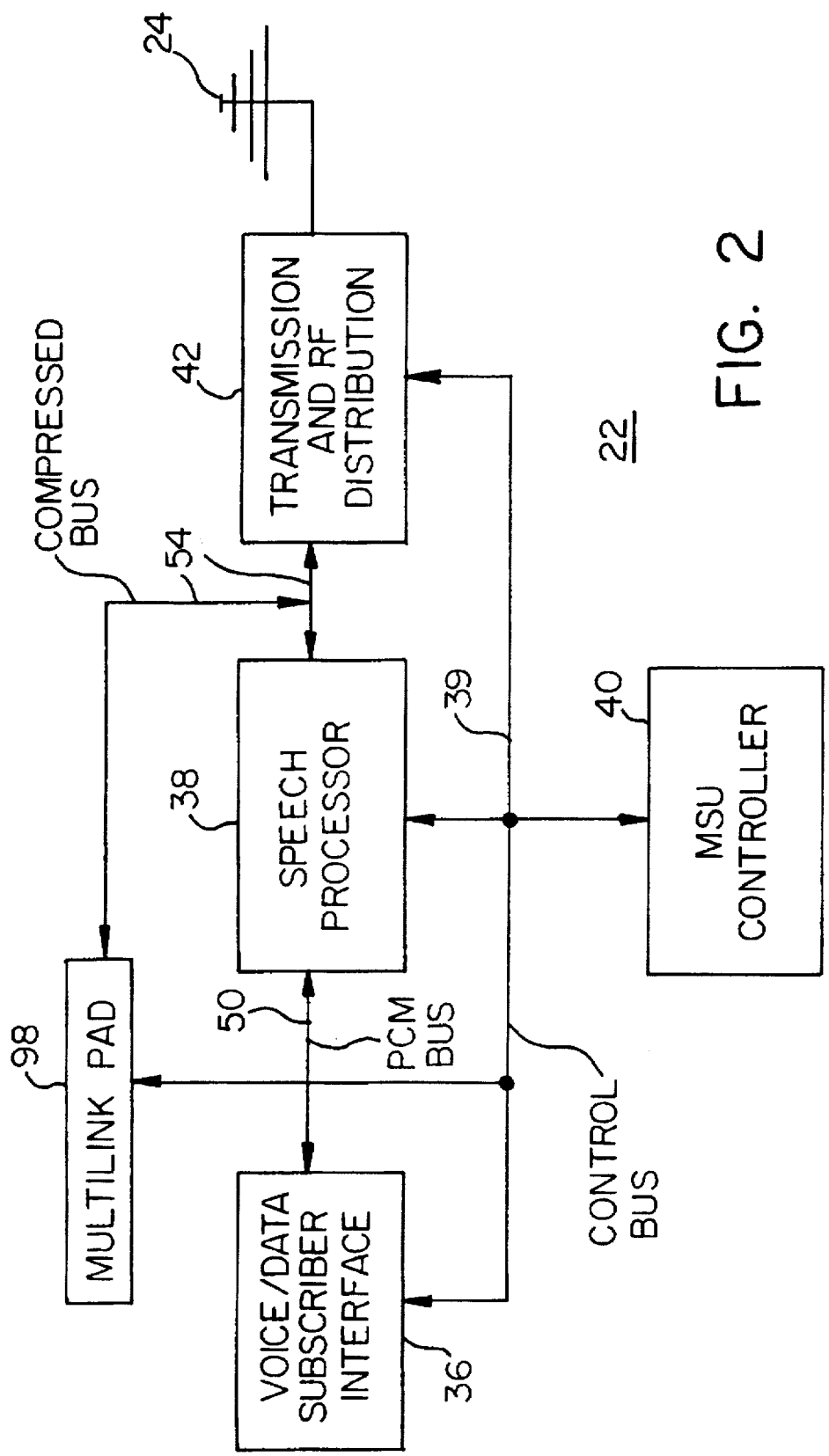
FIG. 2 is a schematic block diagram of the multi-subscriber unit of FIG. 1 in accordance with one embodiment of the invention.

Referring to the embodiment of FIG. 2, each locally non-blocking multi-subscriber unit or MSU 22 has an antenna 24, a functional voice/data subscriber interface 36, a speech processor 38, an MSU controller 40, and a transmission and distribution interface 42; and preferably a multi-link pad 98. Voice/data interface 36, speech processor 38, transmission and RF distributor 42 and multi-link pad 98 are controlled by a controller 40 via a control bus 39. A PCM bus 50 connects the voice/data interface 36 and speech processor 38. A compressed bus 54 connects the speech processor 38 to transmission and RF distributor interface 42.

Figure 3:
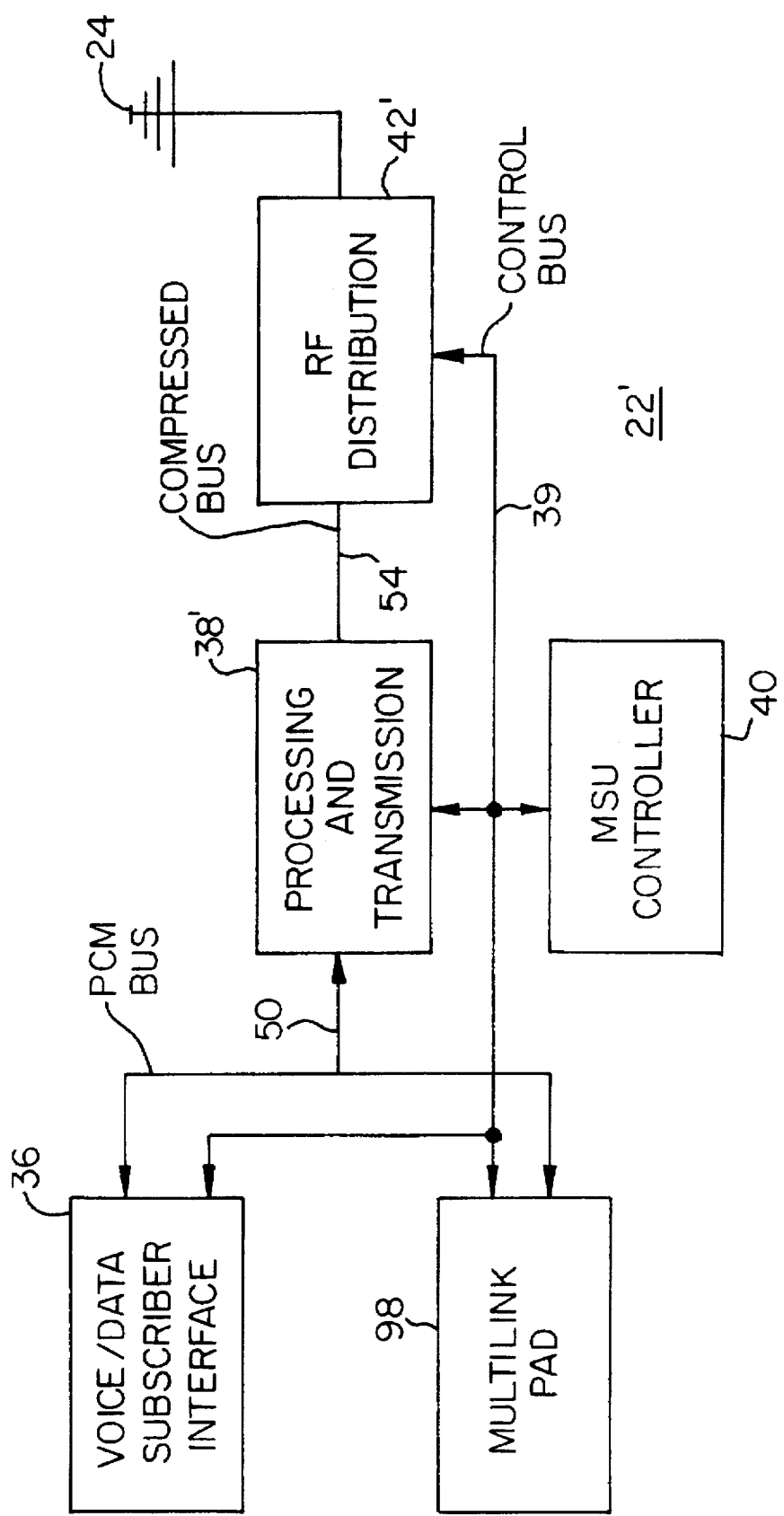
FIG. 3 is a schematic block diagram of a multi-subscriber unit of FIG. 1 in accordance with a second embodiment of the invention.

FIG. 3 refers generally to an alternate embodiment of an MSU referred to generally as 22', which includes an antenna 24, a voice/data subscriber interface 36, a processing and transmission module 38', an MSU controller 40, an RF distribution module 42' and preferably a multi-link pad 98. MSU 22' differs from the local non-blocking (LNB) MSU 22 primarily in that its processing and transmission section 38' comprises a collection of fixed time division multiple access radios where the MSU 22 of FIG. 2 includes shared resources. Also, the RF distribution 42' collects the transmitted signals from the radios and distributes the received signals to the radios. In FIG. 3, the multi-link pad 98, and the voice/data subscriber interface 36 are connected to the processing and transmission module 38' by PCM bus 50; and controlled by controller 40 via control bus 39. Processing and transmission module 38' and RF distribution interface are also controlled via control bus 39. Processing and transmission module 38' are connected to RF distribution interface over compressed bus 54.

In the embodiments of FIGS. 2 and 3, each radio channel may use the time division multiple access protocol described in U.S. Pat. No. 5,299,198, filed on Dec. 6, 1990, which is incorporated herein by reference. In this system, each channel has six time slots, each capable of carrying the output of a speech coder, or providing input to a speech synthesizer.

Figure 4:
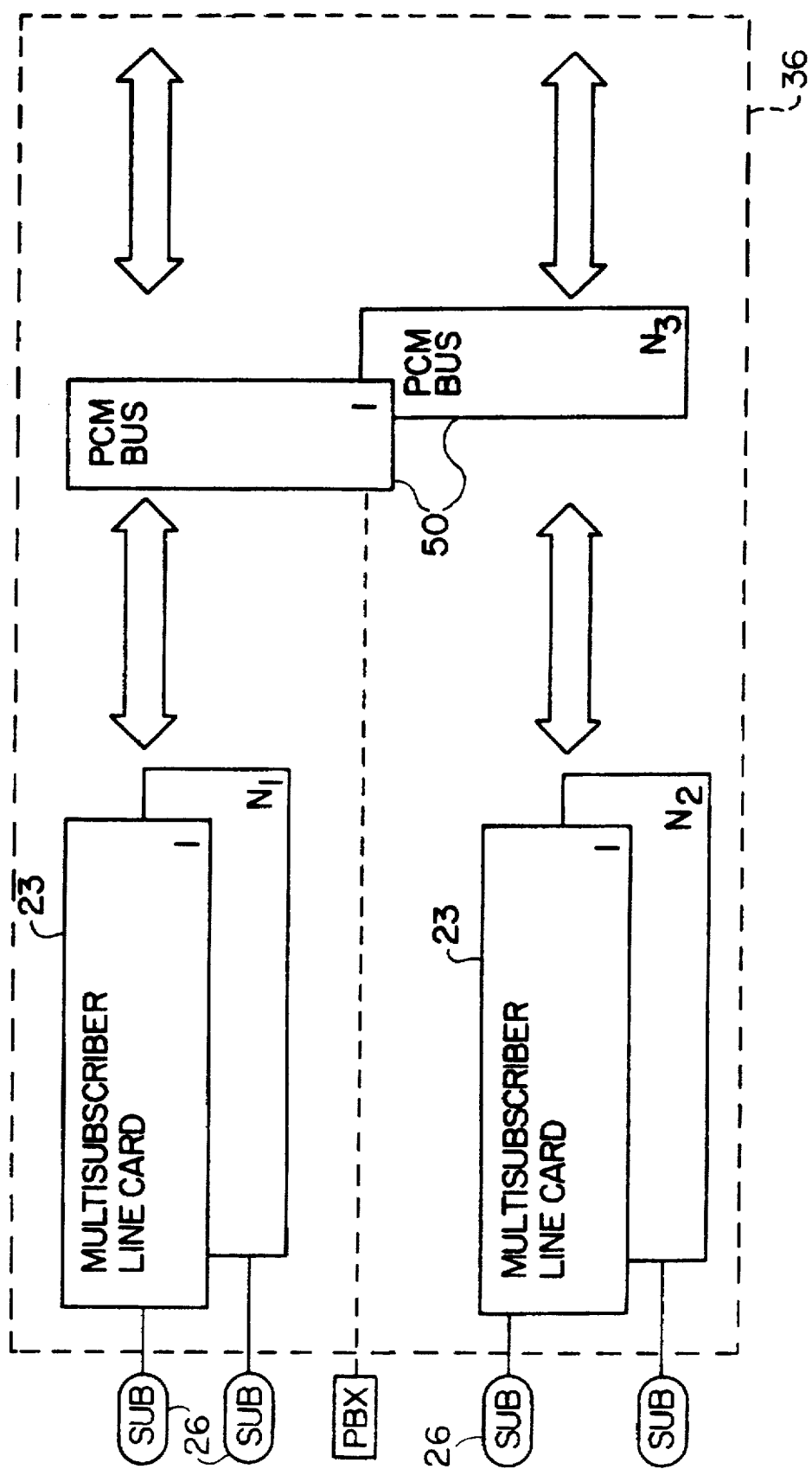
FIG. 4 is a schematic diagram illustrating the multi-subscriber line cards of the multi-subscriber unit of FIG. 1.

Referring to FIG. 4 each voice or data subscriber interface 36 includes up to six multi-subscriber interface cards 23 capable of handling up to 16 subscribers. Telephones 26 connect to MSU 22 via a data subscriber interface and/or voice subscriber interface 36 which provide speech and line signalling to a group of subscribers. Interface 36 is implemented by one or more multi-subscriber line cards 23, as indicated by $N_1$, $N_2$. Each card 23 may, optionally, provide test functions and echo cancellation functions to its attached subscribers. Alternative embodiments may connect a PBX interface directly to PCM bus 50.

Each voice data subscriber interface 36 provides appropriate protocol and signal formats to telephones 26. It also provides on and off-hook information to the MSU controller 40. Each subscriber interface 36 also converts the analog telephone signal to 64 kbps PCM. The voice subscriber interface 36 is modular in two ways. First, multi-subscriber line cards 23 may be added one at a time to serve the required number of local subscribers. Second, PCM busses 50 may be added to serve very large groups of subscribers. By providing one attachment per subscriber to PCM bus, the voice subscriber interface is non blocking. FIG. 4 shows that groups of line cards 23 can comprise different numbers ($N_1$,$N_2$) of cards and that the number of PCM busses ($N_3$) may be different from them. Interface 36 accepts a variety of data formats and protocols including well known Group 3 fax and packet data and converts them into the PCM bus format for transmission.

Figure 5:
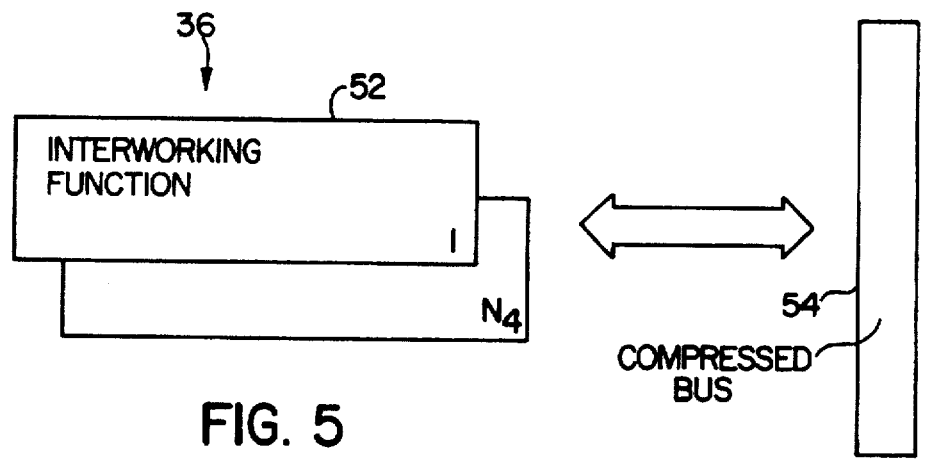
FIG. 5 is a schematic diagram of the data subscriber interface of FIGS. 2 and 3.

In one preferred embodiment, the speech and data subscriber functions are combined. In an alternate embodiment, they may be separate. As shown in FIG. 5, the voice/data subscriber interface 36 comprises $N_4$ four interworking functions 52 which interface compressed bus 54. The data subscriber interface portion accommodates data and facsimile subscribers. In the illustrated embodiments, one subscriber is supported on each data interface. The data interface provides $N_4$ interworking functions which provides physical interfacing to an analog output of the data terminal or facsimile machine, recognition of special tones to control the call progress and signalling rate, conversion of these signals to digital messages, and formatting these messages into the compressed bus format.

The speech processor 38 performs three major functions: voice activity detection to support the digital signal interpolation (DSI) process, speech coding to reduce the transmission bit rate requirements from 64 kbps to a much lower rate for radio transmission, and speech synthesis to reconstruct the compressed signal back to 64 kbps PCM. The transmission and RF distribution equipment 42 transmits and receives the compressed speech on radio channels to and from remotely located sites which collect such transmissions from a plurality of MSU's 22. The MSU controller 40 manages the call processing, speech compression and transmission functions.

Figure 6:
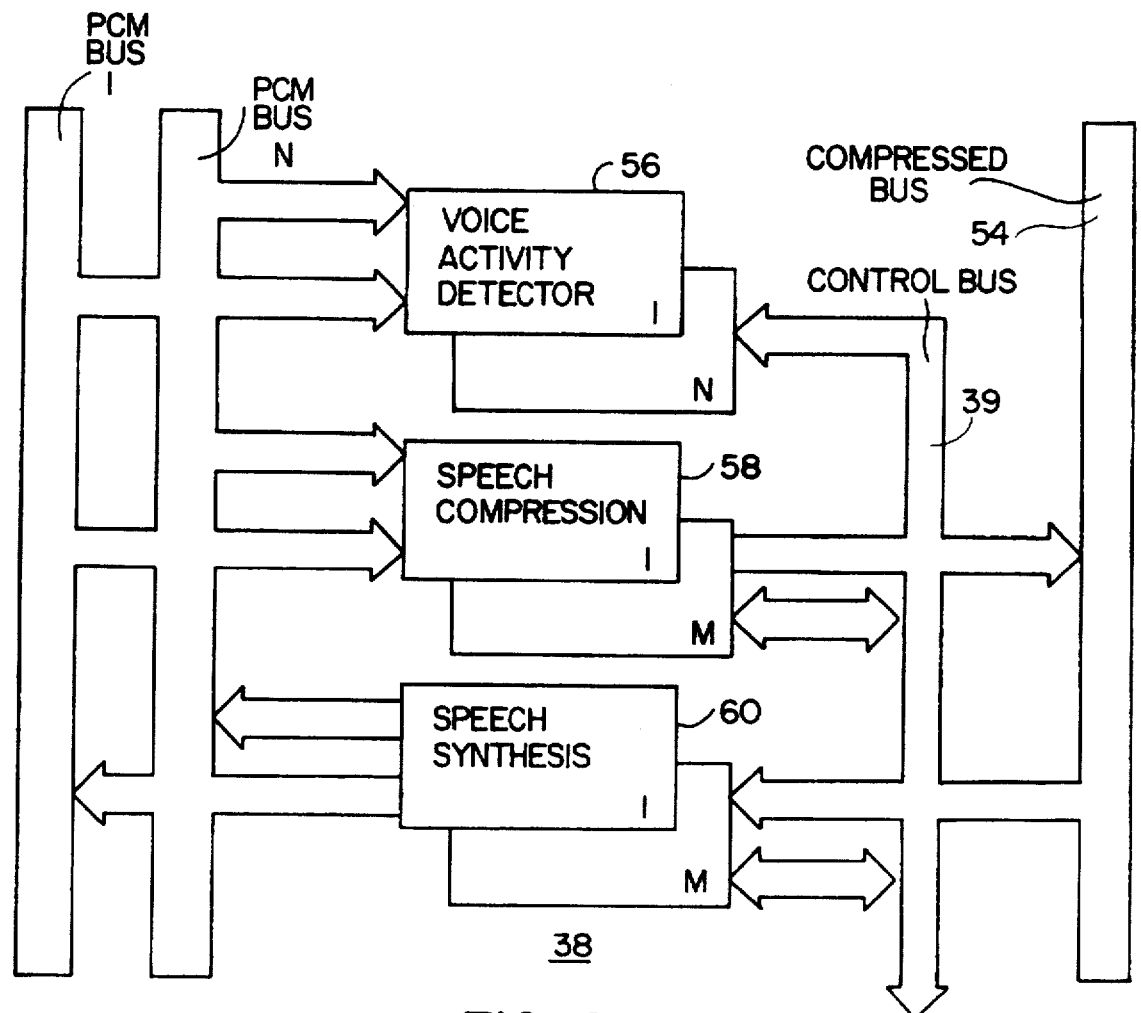
FIG. 6 is a schematic diagram of the speech processor of FIGS. 2 and 3 with voice activity detectors connected according to a first arrangement.
Figure 6A:
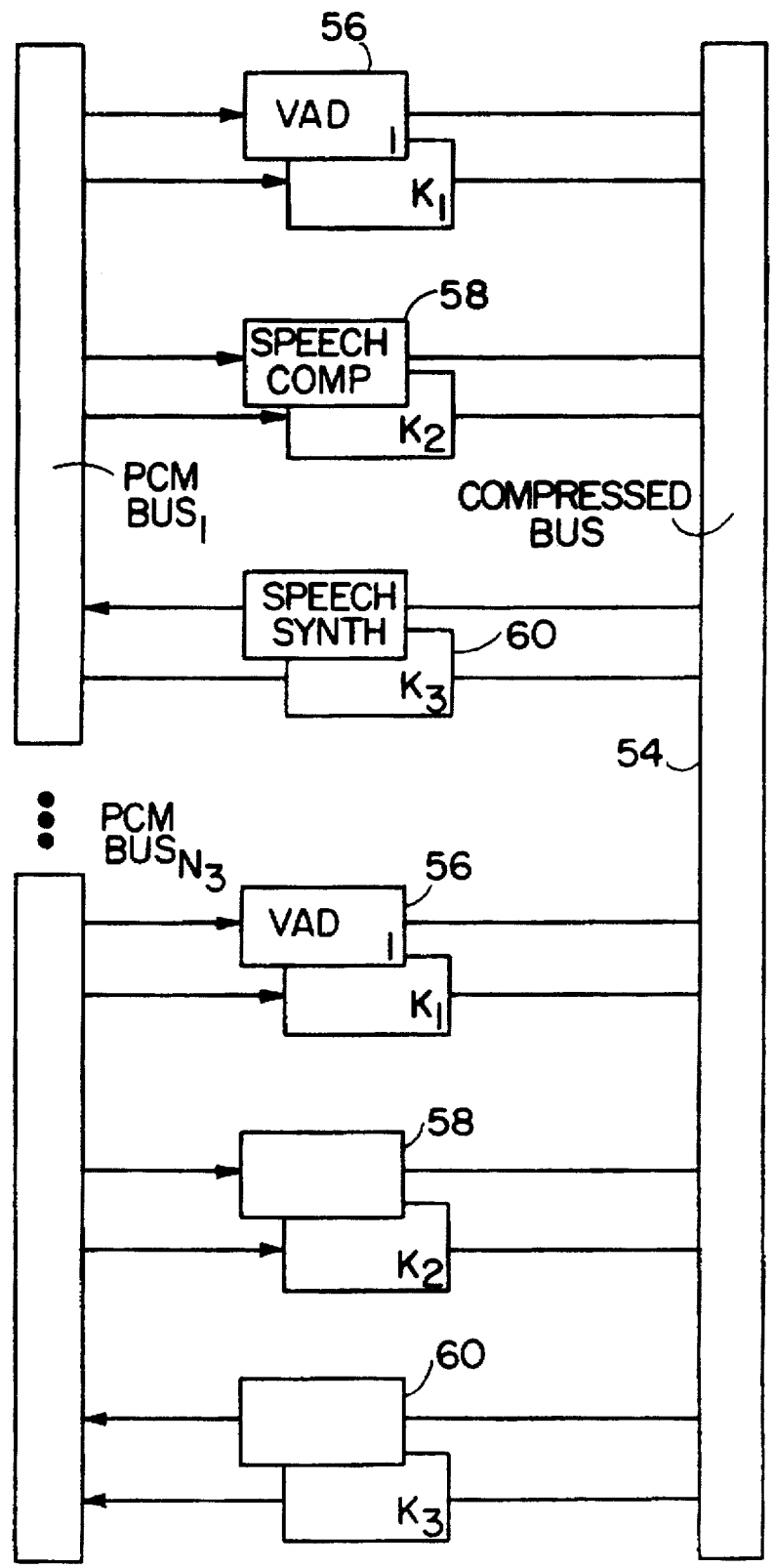
FIG. 6A is a schematic diagram of the speech processor of FIGS. 2 and 3 with the voice activity detectors connected according to a second arrangement.
Figure 6B:
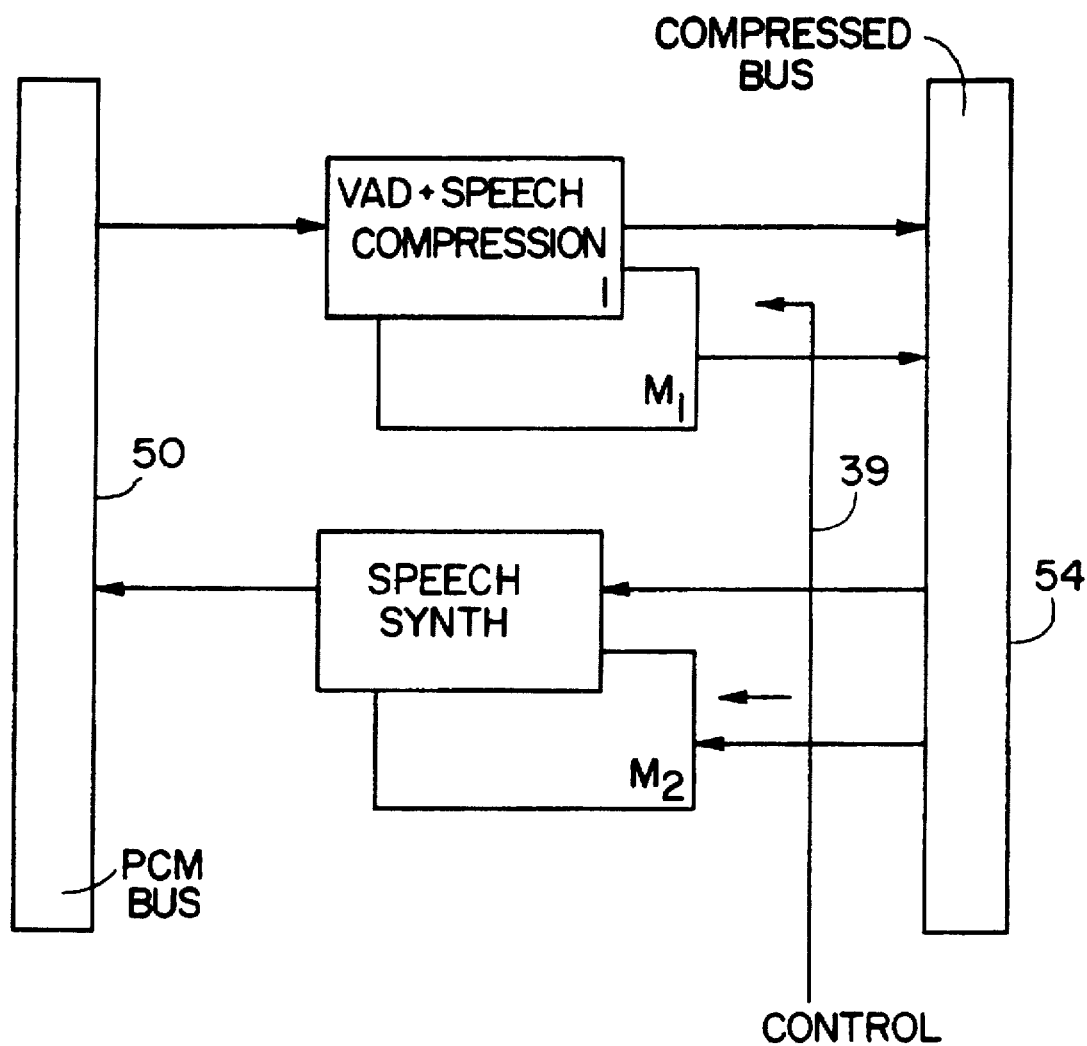
FIG. 6B is a schematic diagram of the speech processors of FIGS. 2 and 3 with the voice activity detectors connected according to a third arrangement.

Referring to FIG. 6, the speech processor 38, which translates speech between PCM voice format and compressed speech format includes a voice activity detector 56, a speech compression module 58, and a speech synthesis module 60. The functions shown in the FIG. 6 may be arranged several different ways depending on economic considerations. The arrangement shown in FIG. 6 shows each speech function connected to all of the PCM busses 50. Alternatively, as shown in FIG. 6A, separate groups of voice activity detectors 56, speech compressors 58 and speech synthesizers 60 can be connected to individual PCM busses 50. Another arrangement is to distribute the voice activity detection function among the compressors and synthesizers as shown in FIG. 6B. Note that the same number (M) of compressors 58 and synthesizers 60 are used in FIG. 6, and that this number differs from the number of voice activity detectors 56 (N). The number of speech synthesizers and compressors required in the described embodiments is the maximum number of telephones that can be off-hook simultaneously. In an alternative embodiment, fewer voice speech synthesizer/compressors could be provided and speech would be clipped if there was excessive concurrent speech activity.

The voice activity detection function 56 examines the PCM data samples from the multi-subscriber unit for voice activity. The onset of voice activity is reported to the MSU controller 40 via the control bus 39. The speech compression function 58 is directed by the MSU controller 40 to collect PCM samples from a particular PCM channel on one of the PCM busses 50. This selected PCM channel will generally be one for which voice activity has been detected, although occasional background noise level measurements will be transmitted. The speech synthesis function 60 accepts compressed samples from the compressed bus 54 and presents 64 kbps PCM data to the PCM bus 50. Each of these three functional elements interfaces the MSU controller 40 via a control bus 39. The voice activity detector 56 sends voice activity detection, i.e., start of speech and end of speech indications. The speech compressor receives commands indicating which PCM channels it should process. The speech synthesizer receives commands telling it which PCM channel should receive its output. The interface with the compressed bus may take a variety of forms. In the described embodiment, each synthesizer and compressor 38 has a dedicated slot on the compressed bus 54. Alternatively, the slots may be dynamically assigned.

Figure 7:
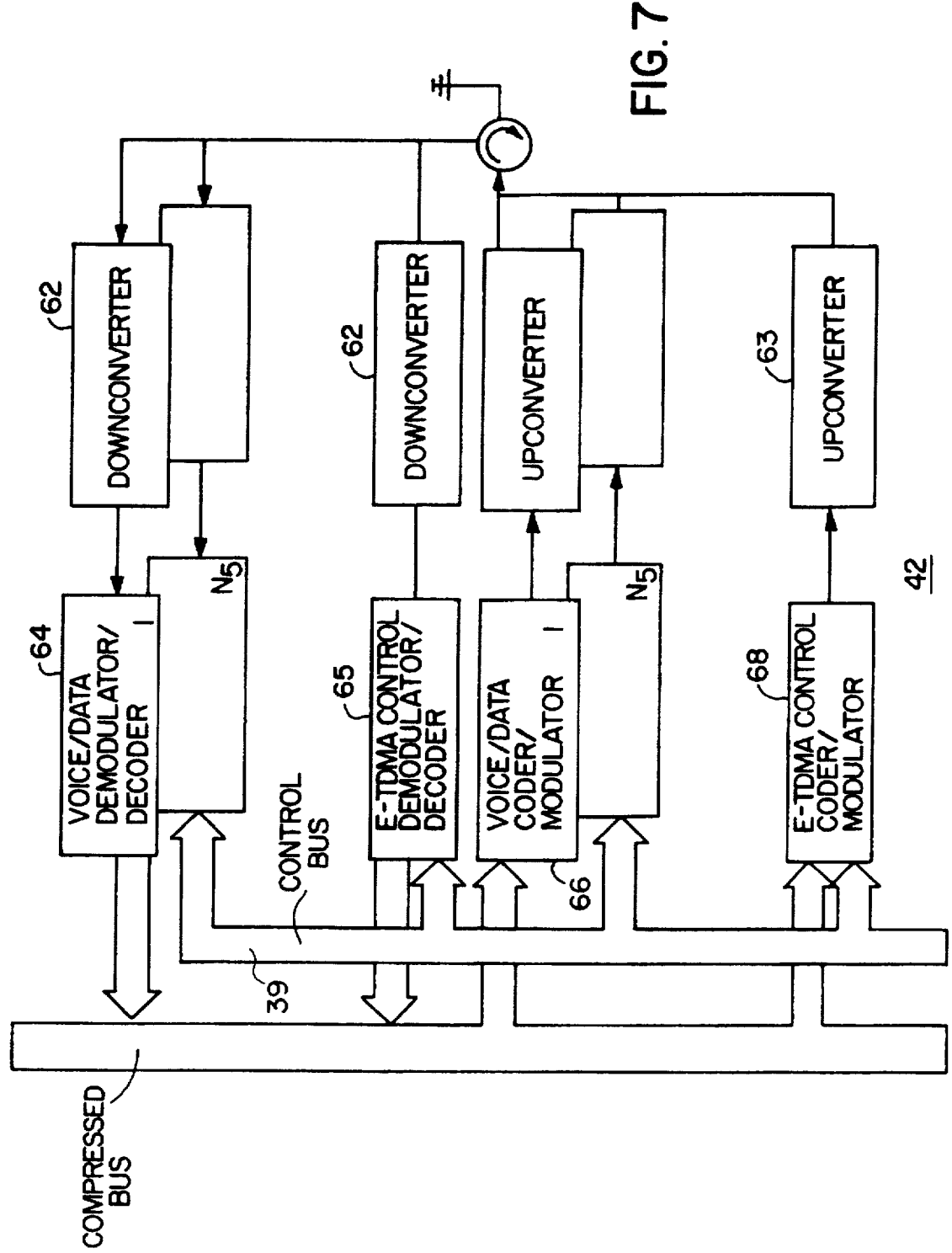
FIG. 7 is a schematic diagram of the transmission and RF distribution interface of FIG. 2.

Referring to FIG. 7, the transmission and distribution function 42 includes down converter 62, voice/data demodulator/decoder units 64, up converter 63, control demodulator/decoder units 65, voice/data coder/modulator 66, and control coder demodulator 68. Preferably, the RF channels operate in the US cellular radio band. However, the MSU can be modified for any frequency band. Down converters 62 translate the RF channel to a lower frequency at which demodulator 62 synchronizes with the received signal and extracts the compressed information. The decoders 64, and 65 use the forward error correcting code redundancy to correct the errors in the received data. This data is then presented to the compressed bus. The demodulation and decoding may be tailored to the mobile product, or they may be tailored to the fixed cellular environment to reduce complexity. The transmission function 42 also includes units for control signalling.

The coder 66, 68 takes data from the compressed bus and adds the forward error correcting redundancy bits. The modulator 66, 68 formats the data, performs the required filtering and passes the information to upconverters 63 which translate it to the appropriate RF frequency.

Antenna such as 24, may be omni directional or may exhibit discrimination. In the preferred embodiment, the antenna 24, is directional to minimize interference and multipath effects. It is to be noted that the system of the present invention may have more than one antenna such as 24 to provide for diversity of reception.

The RF and distributor 42 may be implemented with a fixed frequency, full frequency hopping, or partial frequency hopping, modulator/demodulator and upconverter/down converters shown in FIG. 7. The system may be implemented with a number of fixed frequency channel units to support voice/data traffic. Each MSU may use all six slots on a single frequency. For these units, simulations shows that almost all of the clipping events are due to local blockage. In other words, there are generally slots available to make assignments somewhere in the pool, but not on the few channels available to the fixed frequency units. This alternative, however, is still viable. The simulations shows that four channel MSU units will handle sixty subscribers at less than 1% blockage. The assignment algorithm is random in that the first available slot at a building having a number of fixed subscribers 26 is used for traffic. It may be possible to improve the performance by choosing slots to favor the busier buildings. This makes the fixed frequency channel units a limited technique.

Alternatively, it can be implemented as fully hopping channel units which can access any RF channel of the cellular system on a given time slot which implies that each channel unit has ping-pong synthesizers which provide instantaneous switching between channels. Even so, the digital finite impulse response filters and analog filters have some memory which cannot switch instantaneously. It is possible to sacrifice three or four symbols of the sync word and still have adequate performance in the fixed environment. Preferably, a few symbols of each slot are reserved for synthesizer tuning to avoid the case of the well known ping-pong synthesizer. This will have the same blocking performance as the normal digital speech interpolation (DSI) pool as long as the number of active channels at a site doesn't exceed the number of channels available at the site. For most practical cases, this should be a relatively rare event. For example, in a speech spurt simulation with sixty subscribers per building and three channel MSU units, there were never more than ten subscribers with speech spurts active at the same time. It is possible, however, that the subscriber will occasionally incur a frame of additional latency while waiting for a slot.

Finally, the partially hopping channel unit is a cheaper unit because it only needs one synthesizer and there is no overlap between slots. It can only serve three slots per channel unit but they can hop over the entire pool. If a minimum of two channel units is provided per MSU, then all six slots in a frame will be covered. The performance issue will then be the latency of accessing the channel.

Figure 8:
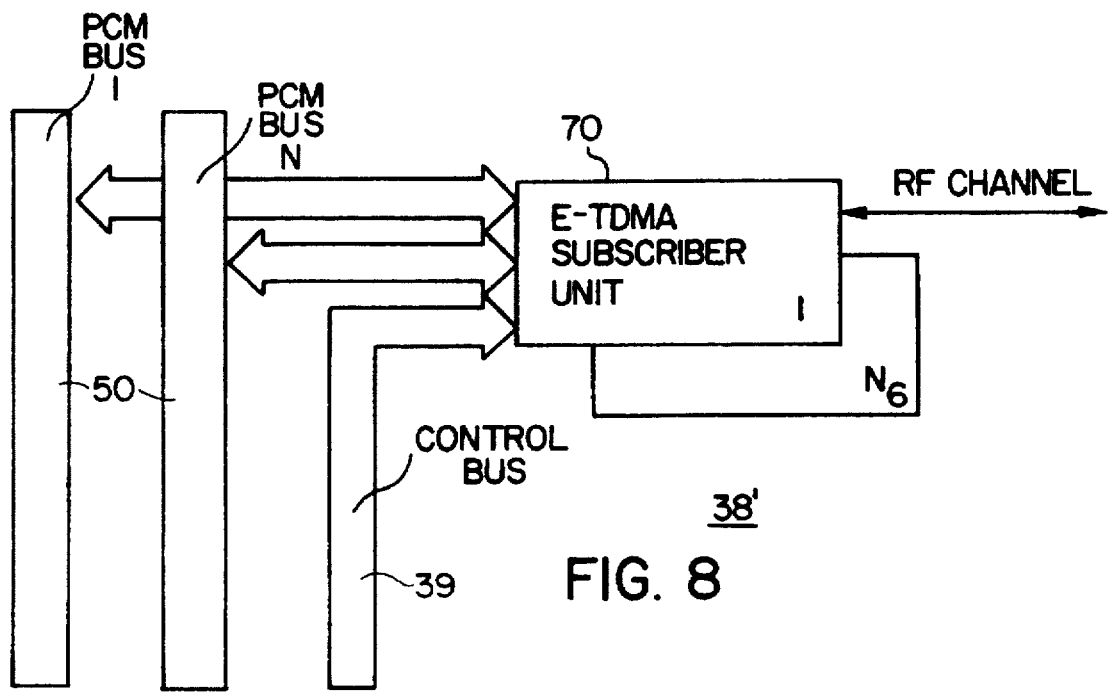
FIG. 8 is a schematic diagram of the processing and transmission interface of FIG. 3.

Referring to FIG. 8, the processing and transmission section of FIG. 3 preferably includes subscriber unit 70 as described in U.S. Pat. No. 5,299,198 filed on Dec. 6, 1990. Each time division multiple access subscriber unit 70 interfaces one or more PCM busses 50. Preferably unit 70 has an internal switch which selects the PCM bus. Alternatively, the unit 70 can decode all PCM busses simultaneously. The control bus 39 interface tells the unit which channels to select. It also indicates whether the channel is voice or data. The unit 70 accepts the PCM channel, performs call establishment, voice activity detection and speech compression/synthesis functions. It also performs all of the transmission related functions, such as upconversion/ downconversion, modulation/demodulation and FEC coding/decoding. For the system of FIG. 3, the call control function modulator/demodulator and the voice modulator/ demodulator would correspond to subscriber unit 70 of FIG. 8.

Figure 9:
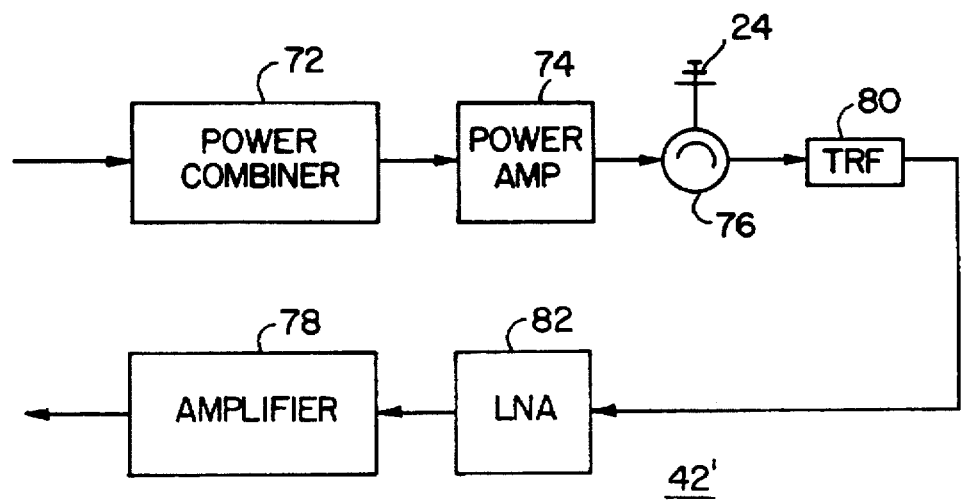
FIG. 9 is a schematic diagram of the RF distribution function of FIG. 3.

Referring to FIG. 9, the RF distribution function 42' has a power combinet 72, a power amplifier 74, a circulator 76, an amplifier 78, a transmit reject filter 80, and a low noise amplifier 82. Power combinet 72 combines the RF outputs from all units 70. The combined signal drives a linear power amplifier 74. This, in turn, is fed to a circulator 76 and then to directional antenna 24. The directional antenna and close spacing of cell sites anticipated for the fixed applications allows relatively low power amplifiers 74 to be used. In other embodiments, individual power amplifiers could be used in each element 70 with a filter type combiner. The antenna 24 provides a receive signal to circulator 76. The circulator output enters a transmit reject filter 80 which filters the transmit band to prevent overload of low noise amplifier 82 front end. The output of the low noise amplifier is then boosted by amplifier 78 and distributed to the units 70.

Alternative arrangements could be implemented. For instance, separate receive and transmit antennas could be provided to avoid the circulator and requirements of filter 80. Also, more than one receive antenna could provide resistance to multipath fading.

Figure 10:
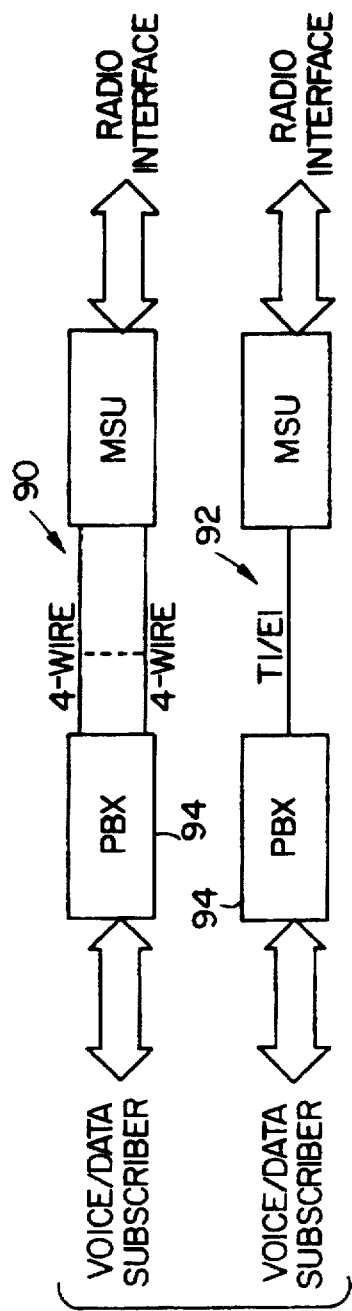
FIG. 10 is a schematic diagram of an alternate type of connection between a subscriber and the multi-subscriber unit of FIG. 1.

Referring to FIG. 10 an alternate interface configuration of FIGS. 2 and 3 is the PBX connection, which affects the subscriber interface portion 36 of the embodiments of FIGS. 2 and 3 in a similar manner. Referring to configurations 90 and 92 PBX 94 performs local call routing and handles any special services required by the local subscribers. In the configuration 90, the PBX provides four wire interface circuits to the MSU. In the configuration 94, a T1 or E1 interface is provided depending on the type of PBX used. The MSU serving the four wire interface is identical to FIGS. 2 and 3 except for the four wire rather than two wire interface. This is true for both voice and data applications. As previously mentioned, the MSU can provide either dedicated data channels in which case the PBX must route data applications to those channels, or combined voice/data interfaces in which case the routing is not needed. For the T1/E1 PBX interface 92, the PBX will interface to the MSU's internal PCM bus via an electrical level and format conversion circuit.

Figure 11:
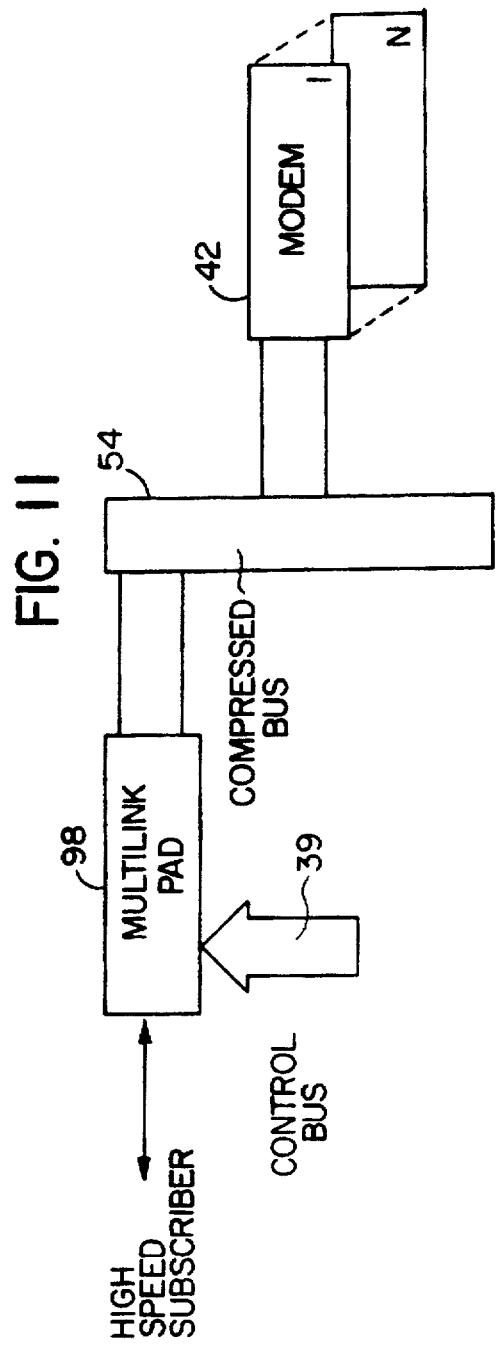
FIG. 11 is a schematic diagram of a high speed data arrangement for the multi-subscriber units of FIGS. 2 and 3.

Referring to FIG. 11, an additional functionality offered by the MSU of FIG. 2 is the transport of high speed data through a multi-link protocol which includes PAD 98, compressed bus 54, and a transmission and RF distributor 42. In a channelized radio system, there are two ways to transport information at rates higher than the basic channel rate. One can group the bandwidth of 2 or more channels into one wider bank higher rate channel, or one can split the information across multiple narrow band channels. The former approach has the disadvantage that it makes dynamic channel allocation very difficult in a cellular system when different bandwidth channels are permitted. The usual difficulty with the latter approach is that a multiplicity of radio channels are needed rather than just one; and that some means of distributing the information among the radio channels is required. In the MSU of FIG. 2, the latter problems are minimized.

The multi-link PAD 98 interfaces the high speed subscriber. It breaks the data stream into packets which are placed in the compressed bus 54. Multiple packets can be placed on the compressed bus for the same timeslot of the air interface. The MSU of FIG. 2 already has the compressed bus interface and multiple modem attachments to the transmission and RF distribution interface 42 to provide the "higher than one channel" throughput.

Of course, for this part of the system to work, there must be a corresponding function at the cell sites and multiple switching center (MSC). This function must distribute the high speed data among many channel units and collect and combine the high speed received data. The advantages of this approach are that high speed data can be carried on the existing MSU hardware of FIG. 2. It will be possible to dynamically assign a modem to handle voice or data during each slot since that is a base MSU function. In the multi-subscriber 22' multi-link PAD 98 is connected to compressed bus 54 and to controller 40 via control bus 39.

Figure 12:
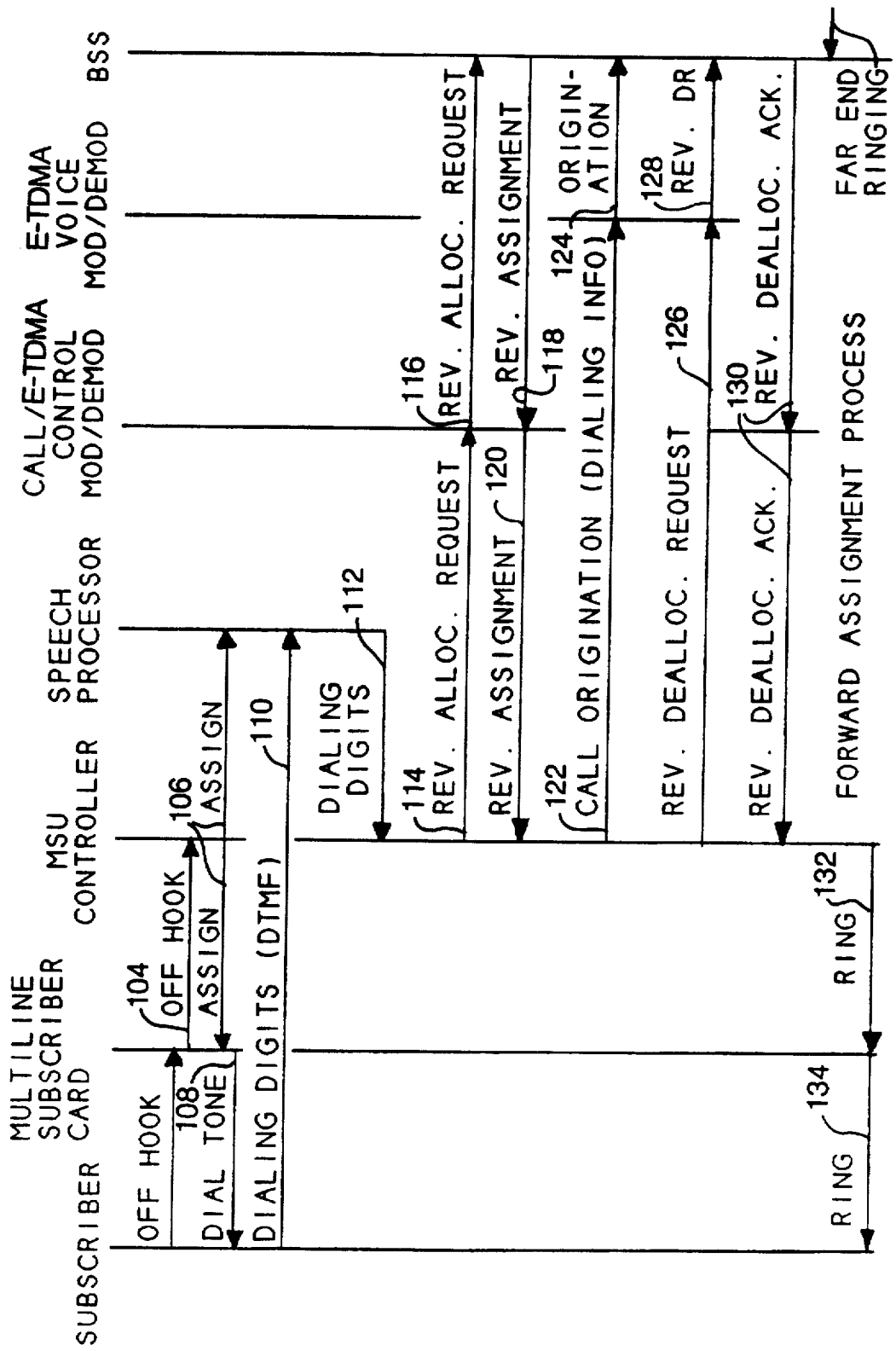
FIGS. 12 and 13 are timing and sequence diagrams illustrating the operation of the multi-subscriber units of FIGS. 2 and 3.
Figure 13:
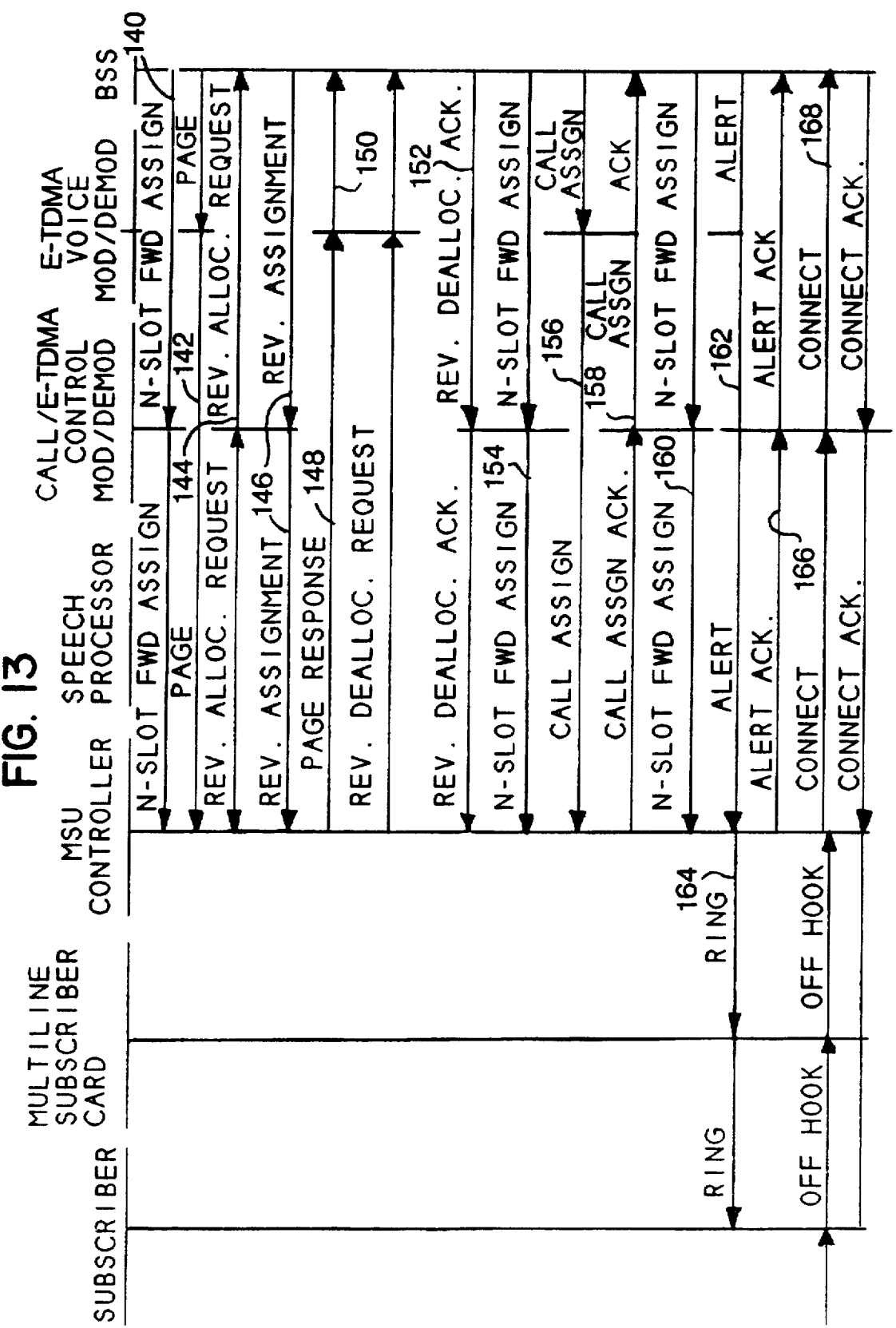

The operation of the fixed radio communication system will first be discussed in connection with its interaction with components and procedures of the mobile time division's multiple access radio communication system described in detail in U.S. Pat. No. 5,299,198, incorporated by reference herein. Following this description is a more detailed description of the signalling sequence of the MSU of FIGS. 2 and 3 as shown in FIGS. 12 and 13.

The time division multiple access procedures provide for the allocation of slots for both call traffic and overhead information. The overhead information is analogous to the analog control channel information of the mobile system. The signalling mechanism for mobile subscribers will be the same as the mobile system. Note that the control and traffic of mobile subscribers will be partitioned from the fixed subscribers. Signalling mechanism for the base station subsystem (BSS) ←→ mobile switch center (MSC) interface is the A-interface which is the link between the MSC and the base station controller (BSC). This is based on signalling system (SS7) access procedures which refer to the procedures between the mobile switching center/visitor location register and the home location register and European call establishment procedures. Modifications to any conventional A-interface procedures will be mentioned herein. The physical interface between the BSS and MSC is a component with 64 kbps PCM traffic channels.

Subscriber level addressing of a particular mobile or fixed subscriber is accomplished by a directory number. The specific format of the directory number is network dependent. The IS-54 air interface uniquely addresses a subscriber by its Mobile Identification Number (MIN). The interface addresses the MSU uniquely within a cell via its MSU identification number (MSU-id). All extended time multiple access slot allocations for overhead are addressed via the MSU-id while all slot allocations for traffic are addressed via the call identifier. The translation of directory number to MIN takes place at the NSS (network subsystem). For fixed subscribers the MSU has the ability to reassign directory numbers to MSU ports without reconfiguration.

Fixed subscribers will include the MSU identification number. Alternatively, a non-hierarchial addressing method may be used. To place a call the subscriber picks up the phone and dials the directory number of the called party. The MSU indicates to the BSS that a subscriber wants to place a call. The NSS and BSS authenticate the subscriber. The BSS indicates to the (MSC) to complete the call to the called party. The traffic path is established for the call and the called party is signalled via ringing. The called party answers the phone and the MSC signals the BSS that the call is established. The traffic channel between the BSS and MSU is allocated on a speech spurt basis. The MSU requests a reverse direction overhead traffic slot from the BSS. When the BSS assigns the slot, the MSU sends an origination message to the BSS. The origination message provides the addressing and security information of the MSU and subscriber.

After the origination message is sent, the overhead traffic slot is deallocated. The BSS establishes a signalling connection with the MSC over the A-interface via SS7 signalling connection control part (SCCP); and no actual authentication is performed. The BSC always responds positively. Ciphering is not done at the BSS. When the MSC asks the BSS to do ciphering, the BSS always responds as if ciphering was initiated. The BSS allocates a forward direction overhead traffic slot and sends a call-id assignment message. The call-id is analogous to the mobile-Id for mobile time division multiple access. The call-id assignment message also contains the reverse response (RR) channel assignment for the MSU response message. The MSU responds to the call-Id assignment with a call-Id ack message sent to the reverse response (RR) channel. The BSS initiates call signalling for the A-interface via the setup message. The MSC indicates the A-interface PCM traffic channel to the BSS via the assign request message. The BSS indicates to the MSC when the traffic path from MSU to MSC is complete. This is signalled via the assign complete message. The MSC indicates to the BSS when the called party is being alerted. This is signalled via the alert message. The MSC will also place a ringing tone on the traffic channel toward the origination. The MSC indicates to the BSS when the call is answered via the connect message. The BSS responds via the connect back. Thus, the call is established.

For an MSU terminated call, MSC queries the VLR/HLR (Visitor Location Register/Home Location Register) for the location area of the called directory number. The MSC pages the BSS where the MSU is located. The BSS determines the MSU of the subscriber and sends the page explicitly to that MSU. The MSU responds to the page. The BSS and MSC authenticate the subscriber. The traffic channel is established from the BSS to the MSC. The MSU signals the local subscriber's phone via a ring. The subscriber answers the phone and the MSU indicates to the BSS that the call is established. The traffic channel between the BSS and the MSU is allocated on a speech spurt basis. The MSC sends a page request to the BSS indicating an incoming call. The BSS extracts the cell information from the page request and extracts the MSU-id from the MIN in the page request. The BSS then allocates a forward overhead traffic slot for the MSU. The BSS sends a page message over the air on the assigned overhead traffic slot. The addressed MSU requests a reverse direction overhead traffic slot. When the BSS assigns the slot, the MSU sends a page response indicating readiness to accept the call. The BSS establishes an SCCP connection with the MSC over the A-interface. No actual authentication is performed. The BSC always responds positively. The BSS allocates a forward direction overhead traffic slot. The BSS then sends a call-id assignment message. The call-id assignment message also contains the reverse response (RR) channel assignment for the MSU response message. The MSU responds to the call-id assignment with a call-id ack message sent on the RR channel. The MSC initiates call signalling for the A-interface via the setup message. The MSC indicates the A-interface PCM traffic channel to the BSS via the assign request message. The BSS indicates to the MSC when the traffic path from MSU to MSC is complete. This indication is signalled via a message indicating that the assignment is completed. The BSS allocates a forward direction traffic slot for the call and sends an alert message. This instructs the MSU to signal the called subscriber. The alert message also contains the reverse response (RR) channel assignment for the MSU response message. The MSU rings the subscriber's phone and sends an alert ack message to the BSS on the RR channel. The BSS informs the MSC of the alerting via the A-interface alert message.

The incoming and outgoing signals from and internal operation of the MSU will now be described in detail in connection with FIGS. 12 and 13.

Referring to FIG. 12 for a call originating at phone 26, when the subscribers phone 26 (FIG. 1) goes off hook, the multiline card 23 in the MSU 22 signals this event to the MSU controller 40 as shown at 104.

The MSU controller 40 sends an assignment message at 106 to the multiple subscriber card telling it the particular speech code module to which it should route the dialing and speech information. MSU controller 40 also informs the speech processor at 106 that dialing digits will soon arrive. The multi-subscriber line card 23 sends a dial tone to the subscriber as shown at 108.

The subscriber then dials the phone number of the called party, and dial tones are sent by the line card to speech processor 38 at 110. The speech processor converts the dial tones to dial digits and sends them to the MSU controller 40 at 112.

MSU controller 40 sends a Reverse Allocate Request at 114. This random access message is formatted, forward error correction coded, and transmitted by the call control modulator 68 to the BSS. The BSS sends a reverse assignment 118 to the MSU. Thus, the MSU assigns a frequency and reserves a time slot in the DSI pool. The call control 65 receives this message and passes it to the MSU controller at 120. The MSU controller 40 formats a call origination message at 122 to the voice demodulator which transmits it in a sequence of one or more voice slots at 124. The formatting of voice slot is designed to handle signalling information as well as voice. After the entire origination message has been sent, the MSU controller 40 sends a reverse deallocation request at 126. This message lets the BSS release this slot and subsequently assign it to some other purpose at 128.

The BSS acknowledges the reverse deallocation request at 130. Each time the called party's phone rings as indicated at 132, the ring is passed back to the local subscriber at 134 using the time division multiple access protocol for forward speech assignment. After the far end subscriber goes off hook, the protocol for sending speech spurts over the air interface between the MSU and the BSS is as described in the referenced patent application.

Referring to FIG. 13, which shows the call establishment for a call terminating at 26, BSS sends N-slot forward assignment message at 140. Thus, identifying a frequency and slot which will contain a message for this MSU. A page message informs the MSU of the incoming call at 142. MSU controller 40 requests the BSS to assign a frequency and slot so that the MSU can send the page response message at 144. BSS then sends the reverse assignment message at 146 as described in the referenced patent application. The MSU controller 40 sends the page response message at 148 to the voice modulator/demodulator 66 which formats it and sends it over the air interface to the BSS at 150. After the entire page response message has been sent, the MSU controller 40 sends a reverse deallocation request at 156. This message lets the BSS release this slot and subsequently assign it to some other purpose. The BSS acknowledges the Reverse therefor Deallocation Request. The BSS then sends an N-slot forward assignment message at 154. This identifies the frequency and slot which will contain a message for this MSU. The BSS then sends the call assignment message at 156 which establishes this as an MSU terminated call. An acknowledgment is then sent from the MSU via the reverse control channel at 158 as described in more detail in the referenced patent application. BSS then sends N-slot forward assignment message at 160, thus, identifying the frequency and slot which will contain the alert message for this MSU.

The BSS sends an alert message at 162 to the MSU for the designated voice slot. The MSU controller 40 responds by ringing the local subscribers phone at 164. An alert acknowledge is sent by the MSU controller via the reverse control channel at 166. If the paged subscriber goes off hook, the MSU controller sends a connect message on the reverse aloha channel at 168; the BSS acknowledges the connect at 170. The protocol following this sequence is the voice protocol as described in the U.S. Pat. No. 5,299,198, and referenced herein.

In summary, the MSU monitors the status of each subscriber port. Off-hook indications invoke per call resource allocation and call establishment procedures. On-hook indications invoke per call resource deallocation and call release procedures. With respect to digit collection, inter-digit timeout is implemented to detect subscriber end of dialing. The timeout is system configurable. Alternatively, end-of-dialing key is defined to allow the subscriber to indicate end-of-digits to the system. In-progress dial tone signalling will be supported. The MSU will support ring generation for subscriber terminated calls. The cadence and period of the ringing is programmable on a system basis. The MSU will provide dial tone to the subscriber when an off-hook is detected, if not blocked. The MSU will provide alert tone to the subscriber for excessive off-hook with no call activity (permanent signal).

The Network Subsystem (NSS) will provide a busy tone if a call origination cannot be completed due to called party unavailable. The MSU will provide a local congestion tone to the subscriber if a call origination cannot be serviced by the MSU or the Base Station Subsystem (BSS). Ring back tone to the origination subscriber is always generated by the NSS. Fixed time division multiple access signalling will be used for all communications between the MSU and the BSS. Time division multiple access signalling includes FAACh, which uses the traffic path, and control, which uses independent control channels within the DSI pool. The control channels of time division multiple access include the Forward Control Channel, the Reverse Response Channel, and the Reverse Aloha Channel (RA). Messages on the FC and RA channels are sent with time and frequency diversity.

Having described the presently preferred embodiments and method of the invention, additional advantages and modifications will readily occur to those skilled in the art. Accordingly, the invention in its broader aspects is not limited to specific details, representative apparatus, and illustrative examples shown and described. Departure may be made from such details without departing the spirit or scope of the general inventive concept as defined by the appended claims and their equivalents.

What is claimed is:

1. In a system for telephony communication of subscriber telephones through a radio link with a remotely located base station, the base station having a transceiver and a link to a telephone network, a multisubscriber unit for radio telephony communication between the subscriber telephones and the base station transceiver comprising:

a plurality of connectors for providing electrical communication with the plurality of subscriber telephones;

a subscriber interface coupled to the connectors for detecting an off-hook condition at each of the telephones;

a subscriber activity detector for detecting, through the connectors, the presence of data to be transmitted at each telephone at which an off-hook condition is detected;

a processor for modulating data from the telephones for transmission over the radio link, the processor having a plurality of modulators each independently assignable to one of the plurality of telephones;

a transceiver for transmitting the modulated data from each telephone at which data is detected to the base station and for receiving data from the base station for transmission to the telephones;

a processor for demodulating data from the transceiver for transmission through the connectors to the telephones, the processor having a plurality of demodulators each independently assignable to one of the plurality of telephones;

a controller for assigning the modulators and demodulators among those telephones for which the presence of data is detected and for deallocating the modulators and demodulators from those telephones for which the end of data presence is detected.

2. The invention of claim 1 wherein the data to be transmitted comprises speech, the subscriber activity detector comprises a speech spurt detector, the processor for modulating data comprises a speech spurt encoder for converting spurts of speech into a compressed digital form, and the processor for demodulating comprises a decoder for converting compressed digital bit sequences into speech spurts.

3. The invention of claim 1 further comprising means coupled to the subscriber activity detector for requesting the allocation of a traffic transmission channel from the base station upon the detection of the presence of data at a telephone.

4. The invention of claim 1 further comprising means coupled to the subscriber activity detector for requesting the deallocation of a traffic transmission channel from the base station upon the detection of the end of data presence at a telephone.

5. The invention of claim 1 wherein the transceiver comprises means for transmitting and receiving frames of digital information in a time division multiple access format each frame including a plurality of time slots for channel allocation and deallocation information.

6. The invention of claim 1 wherein the subscriber interface comprises means for generating a dial tone in response to the detection of an off-hook condition for communication to the telephone for which the off-hook condition was detected.

7. The invention of claim 1 wherein the subscriber interface comprises means for generating a ringing signal in response to an indication of an incoming call from the base station for communication to the telephone for which the incoming call is intended.

8. The invention of claim 1 further comprising:

a bus interconnecting the subscriber interfaces and the processors; and a multilink pad connected to the bus having an input port for a high speed data subscriber for allowing data to be transmitted between the base station and the high speed data subscriber through the transceiver.

9. A method of communicating a plurality of subscriber telephones through a radio link with a base station remotely located from the telephones via a multisubscriber unit connected to each of the plurality of subscriber telephones, the method comprising the steps of:

detecting an off-hook condition at one of the subscriber telephones;

selecting one of a plurality of modulators in response to the detected off-hook condition and assigning the selected modulator to the one subscriber telephone;

transmitting a signal to the base station requesting a reverse channel allocation;

transmitting a reverse channel assignment to the multisubscriber unit from the base station assigning a channel from among a plurality of channels;

transmitting from the multisubscriber unit to the base station, a call origination message identifying the one subscriber telephone and a party to be called; and transmitting a request to deallocate the channel assignment in response to completion of the transmission of the call origination message.

10. The method of claim 9 further comprising, after the step of detecting an off-hook condition, the step of selecting one of a plurality of demodulators in response to the detected off-hook condition and assigning the selected alemodulator to the one subscriber telephone.

11. The method of claim 9 further comprising, after the step of selecting a modulator, the step of generating a dial tone at the multisubscriber unit and transmitting it to the telephone at which the off-hook condition was detected.

12. The method of claim 9 further comprising, before the step of transmitting a call origination message, the step of receiving from the one subscriber telephone a dialing sequence indicating a party to be called and using the received dialing sequence to generate the call origination message.

13. The method of claim 9 further comprising the steps of:

establishing, at the base station a pool of available traffic transmission channels, each traffic transmission channel having a time slot in a repeating time division multiple access frame at a predetermined carrier frequency;

responding at the multisubscriber unit to detection of an information spurt at a telephone, by transmitting a request for assignment of a traffic transmission channel;

selecting at the base station an available traffic transmission channel from the pool of available traffic transmission channels in response to receipt of the channel assignment request;

transmitting in a first slot an identification of the selected channel to the multisubscriber unit and removing the selected channel from the pool of available traffic channels; and transmitting the information spurt from the multisubscriber unit in the selected channel in response to receipt of the identification of the selected channel.

14. The method of claim 13 further comprising the steps of:

detecting termination of the information spurt at the base station;

transmitting a channel deallocation notice to the multisubscriber unit for deallocating the selected channel;

releasing the selected channel to the pool of available traffic transmission channels.

15. The method of claim 14 further comprising the step of transmitting an acknowledgment of the channel deallocation notice from the multisubscriber unit to the base station and wherein the channel deallocation notice includes an identification of an appropriate channel for transmission of the acknowledgment.

16. The method of claim 14 wherein the channel deallocation notice is transmitted in the selected channel.

17. The method of claim 13 wherein the information spurt comprises a speech spurt and wherein the step of transmitting the speech spurt comprises compressing and encoding the detected speech spurt into a digital bit sequence.

18. The method of claim 13 wherein the first time slot comprises a plurality, of time division subslots, wherein the channel assignment is transmitted in a subslot of the first slot and wherein the first slot is of a different channel than the selected channel.

19. The method of claim 9 further comprising the steps of:

establishing, at the base station a pool of available traffic transmission channels, each traffic transmission channel having a time slot in a repeating time division multiple access frame at a predetermined carrier frequency;

detecting a speech spurt at the base station which is intended for transmission to one of the telephones from among the plurality of subscriber telephones;

selecting at the base station an available traffic transmission channel from the pool of available traffic transmission channels in response to the speech spurt detection;

transmitting in a first slot an identification of the selected channel to the subscriber unit and removing the selected channel from the pool of available traffic channels; and transmitting the speech spurt in the selected channel to the multisubscriber unit.

20. The method of claim 19 further comprising the steps of:

detecting, at the base station termination of the speech spurt intended for the telephone;

transmitting to the multisubscriber unit notice of deallocation of the selected channel and releasing the selected channel to the pool of available traffic transmission channels.

21. The method of claim 13 wherein the information spurt comprises a speech spurt and wherein the step of transmitting the speech spurt comprises compressing and encoding the detected speech spurt into a digital bit sequence.

22. The method of claim 13 wherein the first time slot comprises a plurality of time division subslots, wherein the channel assignment is transmitted in a subslot of the first slot and wherein the first slot is of a different channel than the selected channel.

23. A method of communicating a plurality of subscriber telephones through a radio link with a base station via a multisubscriber unit connected to each of the plurality of subscriber telephones, the method comprising the steps of:

receiving at the multisubscriber unit a channel assignment and notification of an incoming call;

transmitting from the multisubscriber unit to the base station a page response for completing a call origination;

receiving at the multisubscriber unit from the base station a call assignment message establishing the incoming call as one that terminates at a subscriber telephone which is coupled to the multisubscriber unit;

transmitting from the multisubscriber unit an acknowledgment of the call assignment message;

transmitting, from the multisubscriber unit to the subscriber telephone at which the incoming call is to terminate, a ringing signal; and transmitting from the multisubscriber unit to the base station a connect message in response to an off-hook detection of the telephone.

24. The method of claim 23, further comprising, after the step of transmitting a page response, the steps of:

transmitting from the multisubscriber unit to the base station a deallocation request for releasing the channel assigned by the channel assignment; and receiving at the multisubscriber unit from the base station acknowledgment of the deallocation request.

25. The method of claim 23 wherein the step of receiving a channel assignment and notification of an incoming call comprises the steps of:

receiving at the multisubscriber unit a message identifying a channel for receipt of a page message;

receiving at the multisubscriber unit a page message including an incoming call notification in the identified channel;

transmitting from the multisubscriber unit a request to the base station to assign a channel for a response to the page message; and receiving from the base station a reverse assignment message assigning a channel for the page response.

26. The method of claim 23 further comprising the steps of:

establishing, at the base station a pool of available traffic transmission channels, each traffic transmission channel having a time slot in a repeating time division multiple access frame at a predetermined carrier frequency;

responding at the multisubscriber unit to detection of an information spurt at a telephone, by transmitting a request for assignment of a traffic transmission channel;

selecting at the base station an available traffic transmission channel from the pool of available traffic transmission channels in response to receipt of the channel assignment request;

transmitting in a first slot an identification of the selected channel to the multisubscriber unit and removing the selected channel from the pool of available traffic channels; and transmitting the information spurt from the multisubscriber unit in the selected channel in response to receipt of the identification of the selected channel.

27. The method of claim 26 further comprising the steps of:

detecting termination of the information spurt at the base station;

transmitting a channel deallocation notice to the multisubscriber unit for deallocating the selected channel;

releasing the selected channel to the pool of available traffic transmission channels.

28. The method of claim 27 further comprising the step of transmitting an acknowledgment of the channel deallocation notice from the multisubscriber unit to the base station and wherein the channel deallocation notice includes an identification of an appropriate channel for transmission of the acknowledgment.

29. The method of claim 27 wherein the channel deallocation notice is transmitted in the selected channel.

30. The method of claim 23 further comprising the steps of:

establishing, at the base station transceiver a pool of available traffic transmission channels, each traffic transmission channel having a time slot in a repeating time division multiple access frame at a predetermined carrier frequency;

detecting a speech spurt at the base station transceiver which is intended for transmission to one of the telephones from among the plurality of subscriber telephones;

selecting at the base station an available traffic transmission channel from the pool of available traffic transmission channels in response to the speech spurt detection;

transmitting in a first slot an identification of the selected channel to the subscriber unit and removing the selected channel from the pool of available traffic channels; and transmitting the speech spurt in the selected channel to the multisubscriber unit.

31. The method of claim 30 further comprising the steps of:

detecting, at the base station termination of the speech spurt intended for the telephone;

transmitting to the multisubscriber unit notice of deallocation of the selected channel and releasing the selected channel to the pool of available traffic transmission channels.

32. The method of claim 26 wherein the information spurt comprises a speech spurt and wherein the step of transmitting the speech spurt comprises compressing and encoding the detected speech spurt into a digital bit sequence.

33. The method of claim 26 wherein the first time slot comprises a plurality of time division subslots, wherein the channel assignment is transmitted in a subslot of the first slot and wherein the first slot is of a different channel than the selected channel.

34. A method of communicating a plurality of subscriber telephones coupled to a multisubscriber unit through a radio link with a base station the method comprising the steps of:

establishing, at the base station a pool of available traffic transmission channels, each traffic transmission channel having a time slot in a repeating time division multiple access frame at a predetermined carrier frequency;

responding at the multisubscriber unit to detection of an information spurt at a telephone, by transmitting a request for assignment of a traffic transmission channel;

selecting at the base station an available traffic transmission channel from the pool of available traffic transmission channels in response to receipt of the channel assignment request;

transmitting in a first slot an identification of the selected channel to the multisubscriber unit and removing the selected channel from the pool of available traffic channels; and transmitting the information spurt from the multisubscriber unit in the selected channel in response to receipt of the identification of the selected channel.

35. The method of claim 34 further comprising the steps of:
  detecting termination of the information spurt at the base station;
  transmitting a channel deallocation notice to the multisubscriber unit for deallocating the selected channel;
  releasing the selected channel to the pool of available traffic transmission channels.

36. The method of claim 35 further comprising the step of transmitting an acknowledgment of the channel deallocation notice from the multisubscriber unit to the base station and wherein the channel deallocation notice includes an identification of an appropriate channel for transmission of the acknowledgment.

37. The method of claim 35 wherein the channel deallocation notice is transmitted in said selected channel.

38. The method of claim 34 wherein the information spud comprises a speech spurt and wherein the step of transmitting the speech spud comprises compressing and encoding the detected speech spurt into a digital bit sequence.

39. The method of claim 34 wherein the first time slot comprises a plurality of time division subslots, wherein the channel assignment is transmitted in a subslot of the first slot and wherein the first slot is of a different channel than the selected channel.

40. The method of claim 34 wherein the step of transmitting an identification of the located channel comprises transmitting the identification with time, frequency or power level diversity.

41. The method of claim 34 wherein the first slot is a slot of a control channel having a plurality of slots assigned to different carrier frequencies.

42. A method of communicating a plurality of subscriber telephones coupled to a multisubscriber unit through a radio link with a base station the method comprising the steps of:
  establishing, at the base station a pool of available traffic transmission channels, each traffic transmission channel having a time slot in a repeating time division multiple access frame at a predetermined carrier frequency;
  detecting a speech spurt at the base station transceiver which is intended for transmission to one of the telephones from among the plurality of subscriber telephones;
  selecting at the base station an available traffic transmission channel from the pool of available traffic transmission channels in response to the speech spurt detection;
  transmitting in a first slot an identification of the selected channel to the subscriber unit and removing the selected channel from the pool of available traffic channels; and
  transmitting the speech spurt in the selected channel to the multisubscriber unit.

43. The method of claim 42 further comprising the steps of:
  detecting, at the base station termination of the speech spurt intended for the telephone;
  transmitting to the multisubscriber unit notice of deallocation of the selected channel and releasing the selected channel to the pool of available traffic transmission channels.

44. The method of claim 42 wherein the information spurt comprises a speech spurt and wherein the step of transmitting the speech spurt comprises compressing and encoding the detected speech spurt into a digital bit sequence.

45. The method of claim 42 wherein the first time slot comprises a plurality of time division subslots, wherein the channel assignment is transmitted in a subslot of the first slot and wherein the first slot is of a different channel than the selected channel.

46. The method of claim 42 wherein the step of transmitting an identification of the located channel comprises transmitting the identification with time, frequency or power level diversity.

47. The method of claim 42 wherein the first slot is a slot of a control channel having a plurality of slots assigned to different carrier frequencies.

* * * * *